US012216941B2

(12) United States Patent
Haba

(10) Patent No.: US 12,216,941 B2
(45) Date of Patent: Feb. 4, 2025

(54) MEMORY SYSTEM

(71) Applicant: Kioxia Corporation, Tokyo (JP)

(72) Inventor: Shintaro Haba, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/464,380

(22) Filed: Sep. 11, 2023

(65) Prior Publication Data

US 2024/0143236 A1 May 2, 2024

(30) Foreign Application Priority Data

Nov. 2, 2022 (JP) ................. 2022-176549

(51) Int. Cl.
*G06F 3/06* (2006.01)
(52) U.S. Cl.
CPC ............ *G06F 3/0659* (2013.01); *G06F 3/061* (2013.01); *G06F 3/0679* (2013.01)
(58) Field of Classification Search
CPC ...... G06F 3/0659; G06F 3/061; G06F 3/0679; G06F 3/0622; G06F 3/0637; G06F 3/067; G06F 21/79; G06F 21/78; G06F 3/0632; G06F 3/0604; G06F 3/0658
USPC ................................. 711/154, 100
See application file for complete search history.

(56) References Cited

U.S. PATENT DOCUMENTS 10,430,103 B1 * 10/2019 Jamail ...................... G06F 3/067
11,437,102 B1 * 9/2022 Cohen ...................... G06F 21/78

| 2008/0059806 | A1 | 3/2008 | Kishida et al. |
| 2017/0041143 | A1 | 2/2017 | Windle et al. |
| 2017/0277916 | A1 | 9/2017 | Natarajan et al. |
| 2019/0236032 | A1 | 8/2019 | Isozaki et al. |
| 2020/0293206 | A1 | 9/2020 | Isozaki et al. |

OTHER PUBLICATIONS

TCG Storage Security Subsystem Class: Opal, Specification Version 2.01, Revision 1.00, https://trustedcommputinnggroup.org/wp-content/uploads/TCG_Storage-Opal_SSC_v2.01_rev1.00.pdf, Trusted Computing Group, Incorporated, Aug. 5, 2015, 80 pages.

* cited by examiner

*Primary Examiner* — David Yi
*Assistant Examiner* — Zubair Ahmed
(74) *Attorney, Agent, or Firm* — Maier & Maier, PLLC

(57) ABSTRACT

A memory system includes a memory area. A controller controls data. A first connector inputs the data and/or outputs the data, and is removable from the host. A first holding part is electrically disconnected from the memory area and the first connector and including a first port, and holds identification information used to authenticate an authority to initialize the memory area. The first port outputs the identification information to the host when receiving, from the host, an initialization command that instructs initialization of at least the part of the memory area. The controller includes a second port and an authentication part. The second port receives the initialization command from the host and receives the identification information via the first port. The authentication part executes initialization of at least the part of the memory area based on the initialization command and the identification information received at the second port.

15 Claims, 7 Drawing Sheets

MEMORY SYSTEM

CROSS REFERENCE TO RELATED APPLICATIONS

This application is based upon and claims the benefit of priority from the prior Japanese Patent Application No. 2022-176549, filed on Nov. 2, 2022, the entire contents of which are incorporated herein by reference.

FIELD

The embodiments of the present invention relate to a memory system.

BACKGROUND

In SEDs (Self-Encrypting Drives) that comply with the TCG (Trusted Computing Group) standards, identification information to obtain a PSID (Physical Presence Security Identifier) authority is printed on a housing of the SED. Even when the SED is in a locked state, a memory area of the SED can still be initialized if an optical reading of the identification information to obtain the PSID authority and a recognition of the identification information were successfully made. However, in a case where the SED is not provided on a housing and provided inside a server, a personal computer, or the like, it may be difficult to optically reading of the identification information on the PSID. For example, as a SED, SSD has the difficulty of the optical reading of the identification information if the SSD is in the locked state. In this case, it is difficult to initialize the memory area of the SSD.

An initialization of a memory area of an SED is to restore the memory area of the SED to a state of pre-shipment, i.e., a state at the time shipping to a market from a factory, the state being no user data in an user area.

DETAILED DESCRIPTION

Figure 1:
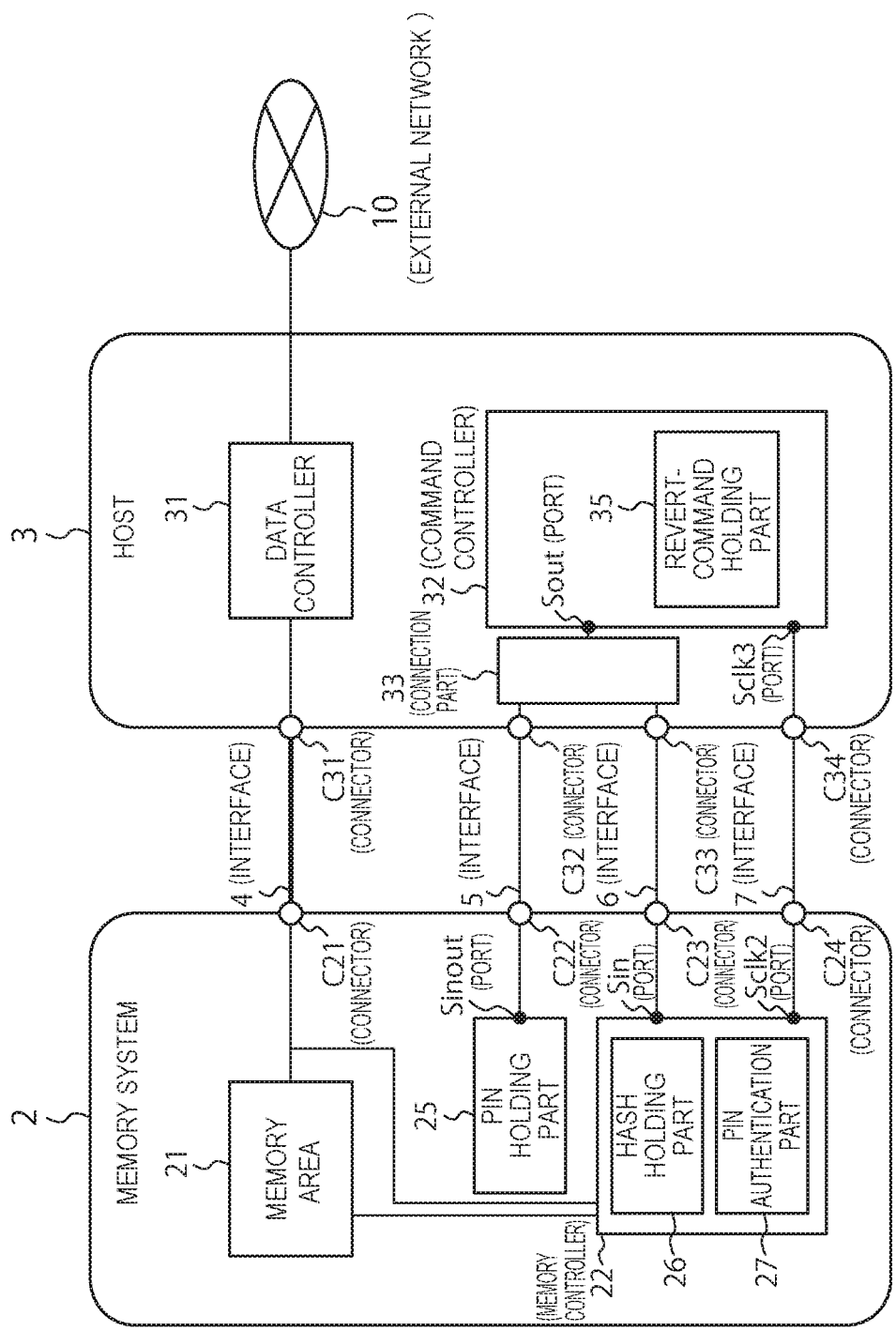
FIG. 1 is a block diagram illustrating an example of a configuration of a memory system according to a first embodiment.

Embodiments will now be explained with reference to the accompanying drawings. The present invention is not limited to the embodiments. The drawings are schematic or conceptual. In the specification and the drawings, identical elements are denoted by like reference characters.

A memory system according to the present embodiment includes a memory area configured to store data therein. A controller controls writing data to be input to and/or reading data to be output from the memory area. A first connector inputs the data to be input to the memory area from a host and/or outputs the data to be output from the memory area to the host, and is removable from the host. A first holding part is electrically disconnected from the memory area and the first connector and including a first port, and holds identification information used to authenticate an authority to initialize the memory area. The first port outputs the identification information to the host when receiving, from the host, an initialization command that instructs initialization of at least the part of the memory area. The controller includes a second port and an authentication part. The second port receives the initialization command from the host and receives the identification information via the first port. The authentication part executes initialization of at least the part of the memory area based on the initialization command and the identification information received at the second port.

First Embodiment

FIG. 1 is a block diagram illustrating an example of the configuration of an information processing system 1 according to a first embodiment.

The information processing system 1 includes a memory system 2 and a host 3. The memory system 2 and the host 3 transmit and receive data through an interface 4 such as NVMe (PCIe)™.

The memory system 2 is a storage having a data protection function incorporated therein. The memory system 2 is, for example, an SSD (Solid State Drive) or an HDD (Hard Disk Drive). For example, a NAND flash memory may be used in the memory system 2. The data protection function is a TCG (Trusted Computing Group)-compliant protection function. Examples of the data protection function include a protection function by means of encryption to encrypt and store data, a protection function by means of locking to prohibit anyone other than certain individuals from accessing the area assigned to the certain individuals, and a protection function by means of both the encryption and locking.

The host 3 is a processing device external to the memory system 2 and is connectable to the memory system 2 and removable from the memory system 2. For example, the host 3 is a server or a PC (personal computer) that uses the memory system 2 as a data storage. For another example, the host 3 is a dedicated device, to be used by a manufacturer of the memory system 2, a manufacturer of the information processing system 1, or a user, to perform several settings for the memory system 2 or to issue several commands to the memory system 2. In the TCG standards, as one of the commands issued from the host, a revert command is defined. The revert command is a command that perform an operation of a revert to initializes the memory area. The initialization of the memory area is to restore the memory area to a state of pre-shipment, i.e., a state before shipping to a market from a factory, the state being no user data in an user area. In this state, a certain data, such as management data may be existing in a management area of the memory area. Thus, the initialization of at least the part of the memory area is performed.

The term, "revert command" can be referred as an initialization command. In the present embodiments, the host initializes the memory area 21 of the memory system by issuing the revert command to the memory system.

Also, the term "revert" refers to initializing the memory area 21. In the following descriptions, initialization of the memory area 21 is sometimes referred to as "revert". In either case, the host 3 is connectable to the memory system 2 and removable from the memory system 2. The host 3 may be connected to an external network 10 to be capable of communicating with the external network 10. For example, the host 3 transmits data received from the external network 10 to the memory system 2 through connectors C31 and C21 and the interface 4. The host 3 receives data in the memory system 2 through the connectors C21 and C31 and the interface 4, and transmits the data to the external network 10. That is, the interface 4 is a so-called "in-band interface".

The memory system 2 includes the memory area 21, a memory controller 22, the connector C21, connectors C22 to C24, and a PIN holding part 25.

The memory area 21 is an area configured to store therein data that can be used by a user, for example. Upon receiving a read command or a write command from the outside such as the host 2, the memory controller 22 reads data from the memory area 21, or writes data to the memory area 21.

The PIN holding part 25 is, for example, a memory. The PIN holding part 25 includes a port Sinout. In the embodiment, the PIN holding part 25 holds identification information C_PIN as data used to authenticate a PSID (Physical Presence Security Identifier) authority. The PSID authority refers to an authority to initialize the memory area 21. That is, when the PSID authority is given, it is possible to execute initializing of the memory area 21. Usually, an identification information C_PIN is a form of a string of characters which is printed on a label attached to a package of the memory system 2, or is printed on a housing of the memory system 2 or the like and uniquely given to each memory system. The PIN holding part 25 of this embodiment outputs the identification information C_PIN as data held or stored therein from the port Sinout. During an operation other than reverting, normally the PIN holding part 25 is electrically disconnected from constituent elements connected to the external network 10, such as the memory area 21, the connectors C21 and C31, the interface 4, and a data controller 31. Here, the operation other than reverting is normal operations other than the reverting, i.e. other than the initialization of the memory area. Such the operations may include reading data to be output from the memory area 21 and writing data to be input to the memory area 21.

The port Sinout is a serial bus input-output port. The port Sinout is electrically connected to the connector C22 to be described later. The port Sinout receives a revert command from the host 3. The port Sinout transmits the identification information C_PIN from the PIN holding part only when receiving the revert command. The port Sinout is electrically disconnected from the constituent elements connected to the external network 10, such as the memory area 21, the connectors C21 and C31, the interface 4, and the data controller 31.

The memory controller 22 is a controller configured to control the memory area 21. The memory controller 22 may be constituted by a processor such as a single CPU (Central Processing Unit) or a plurality of CPUs. When the PSID authority is given, the memory controller 22 can collectively invalidate the data in the memory area 21 in its entirety. The memory controller 22 can initialize the memory area 21 by invalidating the data in the memory area 21 in its entirety.

The memory controller 22 includes a hash holding part 26, a PIN authentication part 27, a port Sin, and a port Sclk2.

The hash holding part 26 is, for example, a memory. The hash holding part 26 holds a hash value of the identification information C_PIN. This hash value is obtained by converting the identification information C_PIN in advance by using a hash function, and is used to authenticate the identification information C_PIN.

The PIN authentication part 27 is, for example, a processor such as a CPU. The PIN authentication part 27 determines whether to execute reverting based on a revert command and the identification information C_PIN. The revert command is a command that instructs initialization of the memory area 21.

The port Sin is a serial bus input port used for receiving a revert command. The port Sin is electrically connected to the connector C23 to be described later. The port Sin receives a revert command from the host 3. The port Sin receives the identification information C_PIN from the port Sinout.

At the time of executing reverting, the port Sin is connected to a port Sout and the port Sinout through a connection part 33 of the host 3. That is, the port Sinout, the port Sin, and the port Sout short-circuit to each other at the time of executing reverting.

The connectors C21 to C24 are provided for external connection. The connectors C21 to C24 are removably connected to connectors C31 to C34 provided on the host 3, respectively.

The connector C21 is electrically connected to the memory area 21. The connector C21 is removably connected to the connector C31. The connector C21 is connected to the connector C31 by the interface 4 such as NVMe® (PCIe®) to be capable of communicating with the connector C31. The connector C21 is electrically disconnected from the PIN holding part 25 and the port Sinout.

The connector C22 is electrically connected to the host 3 via the port Sinout. The connector C22 is removably connected to the connector C32. The connector C22 is used to receive a revert command and other data, and transmit the identification information C_PIN for the PSID authority. The connector C22 is connected to the connector C32 by a serial communication interface 5 to be capable of communicating with the connector C32. The connector C22 is electrically disconnected from the connector C21. The interface 5 is a so-called "out-of-band interface".

According to such configuration, the identification information C_PIN is not transmitted to the connector C21 and the interface 4. So a leakage of the identification information C_PIN to outside of the memory system 2 is prevented.

The connector C23 is electrically connected to the port Sin. The connector C23 is removably connected to the host 3 via the connector C33. The connector C23 is used to receive a revert command, the identification information C_PIN for the PSID authority, and other data. The connector C23 is connected to the connector C33 by a serial communication interface 6 to be capable of communicating with the connector C33. The connector C23 is electrically disconnected from the connector C21. The interface 6 is a so-called "out-of-band interface".

The connector C24 is connected to a port Sclk2. The port Sclk2 is a serial bus input port to be used to receive a clock signal for synchronization between the memory system 2 and the host 3. The connector C24 is used to receive the clock signal. The connector C24 is connected to the connector C34 by a serial communication interface 7 to be capable of communicating with the connector C34. The connector C24 is electrically disconnected from the connectors C21 to C23, the port Sinout, and the port Sin.

The host 3 includes the data controller 31, a command controller 32, the connectors C31 to C34, and the connection part 33. The host 3 may be constituted by a processor such as a single CPU or a plurality of CPUs.

The data controller 31 is a controller configured to transmit and receive data between the external network 10 and the memory system 2. The data controller 31 is constituted by, for example, a processor such as a CPU and a memory. The data controller 31 transmits data received from the external network 10 to the memory system 2. The data controller 31 transmits data received from the memory system 2 to the external network 10.

The command controller 32 is a controller configured to output a revert command to the memory system 2. The command controller 32 is constituted by, for example, a processor such as a CPU and a memory. The command controller 32 controls a revert-command holding part 35 to transmit a revert command from the revert-command holding part 35 to the memory system 2. The command controller 32 also transmits a clock signal to the memory system 2 through a port Sclk3 and the connector C34.

The connector C31 is electrically connected to the data controller 31. The connector C31 is removably connected to the connector C21. The connector C31 is electrically disconnected from the connectors C32 and C33 and the port Sout.

The connector C32 is electrically connected to the port Sout. The connector C32 is removably connected to the connector C22 of the memory system 2. The connector C32 is used to output a revert command. The connector C32 is used to input the identification information C_PIN. The connector C32 is electrically disconnected from the connector C31.

The connector C33 is electrically connected to the port Sout. The connector C33 is removably connected to the connector C23 of the memory system 2. The connector C33 is used to output a revert command. The connector C33 is used to output the identification information C_PIN. The connector C33 is electrically disconnected from the connector C31.

The connector C34 is connected to the port Sclk3. The connector C34 is removably connected to the connector C24. The port Sclk3 is a serial bus output port to be used to transmit a clock signal. The connector C34 is electrically disconnected from the connectors C31 to C33 and the port Sout.

The connection part 33 is electrically connected to the connector C32, the connector C33, and the port Sout. The connection part 33 electrically short-circuits the connector C32, the connector C33, and the port Sout when reverting of the memory area 21 is executed. The connection part 33 outputs a revert command simultaneously to both the connectors C32 and C33. Since the connection part 33 is electrically short-circuited to the connectors C32 and C33, the connectors C22 and C23 of the memory system 2 are also short-circuited through the connectors C32 and C33. With this configuration, the connection part 33 inputs the same revert command simultaneously to the connectors C22 and C23. The connection part 33 inputs the identification information C_PIN output from the connector C22 to the connector C23.

The command controller 32 includes the revert-command holding part 35, the port Sout, and the port Sclk3.

The revert-command holding part 35 is, for example, a memory. The revert-command holding part 35 holds a revert command that is a command to be output to revert the memory area 21.

The port Sout is a serial bus output port. The port Sout is used to output a revert command. The port Sout is electrically connected to the connectors C32 and C33 to be described later. The port Sout is electrically disconnected from the constituent elements connected to the external network 10.

Figure 2:
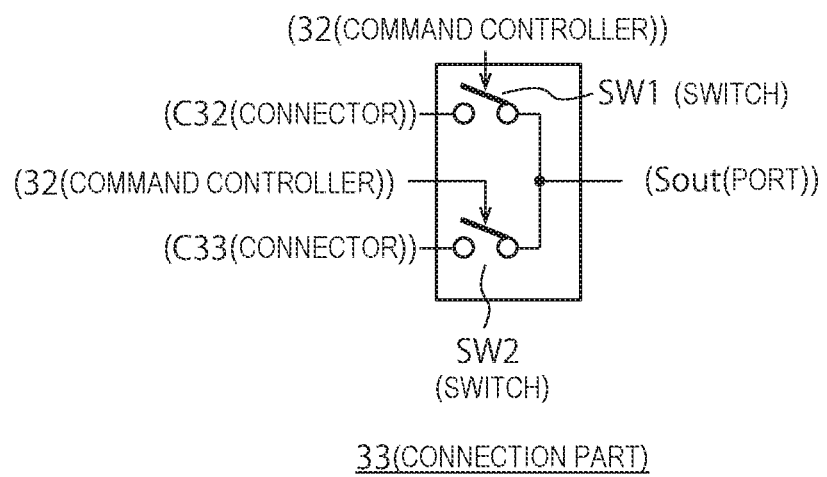
FIG. 2 is a diagram illustrating a configuration of a connection part according to the first embodiment.

FIG. 2 is a diagram illustrating the configuration of the connection part 33 according to the first embodiment.

The connection part 33 includes a switch SW1 and a switch SW2. Each of the switches SW1 and SW2 is constituted by, for example, a transistor. The switch SW1 is connected between the port Sout and the connector C32. The switch SW2 is connected between the port Sout and the connector C33. The switches SW1 and SW2 are electrically connected to the command controller 32. The switches SW1 and SW2 are controlled simultaneously by the command controller 32. The switches SW1 and SW2 enter a conductive state immediately before a revert command is issued. The switches SW1 and SW2 enter a non-conductive state after reverting is executed.

Next, operations of the information processing system 1 are described.

Figure 3:
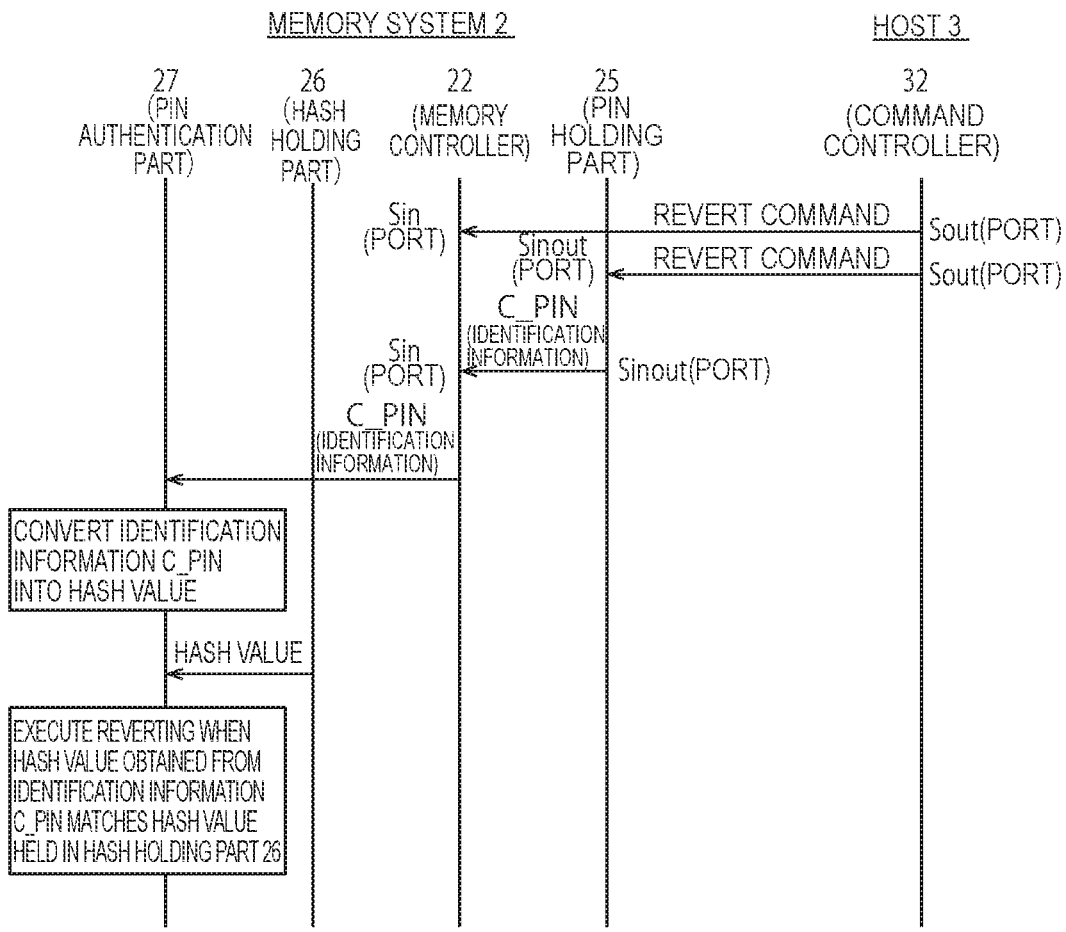
FIG. 3 is a sequence diagram illustrating an example of an operation of the memory system according to the first embodiment.

FIG. 3 is a sequence diagram illustrating an example of the operation of the information processing system 1 according to the first embodiment.

When a user requests reverting on the host 3, the command controller 32 of the host 3 outputs a revert command from the port Sout. When reverting is requested on the host 3, the command controller 32 of the host 3 brings the switches SW into a conductive state. With this operation, the port Sinout and the port Sin of the memory system 2 are short-circuited.

A revert command is input to the port Sin and the port Sinout of memory system 2. Since the port Sin and the port Sinout of the memory system 2 are short-circuited, the revert command is input almost simultaneously to both the port Sin and the port Sinout.

Upon receiving the revert command at the port Sin, the memory controller 22 of the memory system 2 is on standby to receive the identification information C_PIN.

In contrast, upon receiving the revert command at the port Sinout, the PIN holding part 25 of the memory system 2 issues the identification information C_PIN on the PSID authority. The identification information C_PIN is output from the port Sinout and input to the port Sin.

Upon receiving the identification information C_PIN at the port Sin, the PIN authentication part 27 of the memory controller 22 converts the identification information C_PIN received from the port Sin into a hash value by using a hash function. Further, the PIN authentication part 27 compares the hash value obtained by converting the identification information C_PIN with the hash value held in advance in the hash holding part 26. The identification information C_PIN can be safely authenticated by using the hash values.

When the hash value obtained from the identification information C_PIN matches the hash value held in the hash holding part 26, the PIN authentication part 27 executes reverting of the memory area 21.

When the hash value obtained from the identification information C_PIN does not match the hash value held in the hash holding part 26, the IN authentication part 27 does not execute reverting of the memory area 21.

In the information processing system 1 in the first embodiment, when reverting is not being executed, the identification information C_PIN is not leaked from the interface 4 to the external network 10. The reason for this is that the PIN holding part 25 having the identification information C_PIN stored therein is electrically disconnected from the interface 4 configured to transmit and receive data, such as NVMe® (PCIe®).

In the first embodiment, the identification information C_PIN on the PSID authority is held in the memory controller 22 of the memory system 2. The information processing system 1 in the first embodiment can initialize the memory area by using the identification information C_PIN on the PSID authority without optically reading identification information to obtain the PSID authority.

Meanwhile, a revert command is needed to execute reverting, and reverting is not executed by solely short-circuiting the port Sinout and the port Sin. Accordingly, the information processing system 1 can prevent the memory area from being accidentally initialized.

In the memory system 2 in the first embodiment, the PIN holding part 25 electrically disconnected from the external network 10 has the identification information C_PIN stored therein, so that the identification information C_PIN can be prevented from being leaked to the external network 10.

Further Embodiment

Figure 4:
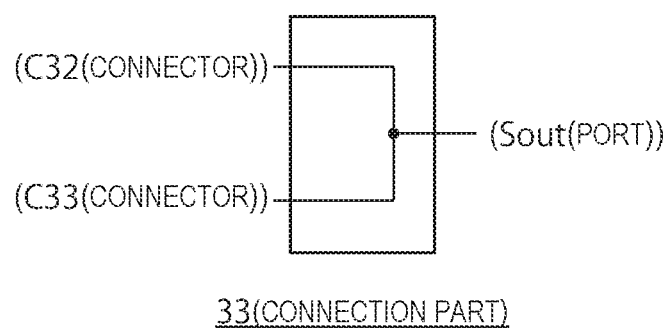
FIG. 4 is a diagram illustrating a configuration of a connection part according to a modification of the first embodiment.

FIG. 4 is a diagram illustrating the configuration of the connection part 33 according to a further embodiment of the first embodiment. The connection part 33 according to the further embodiment is a wiring configured to electrically connect the port Sout and the connectors C32 and C33. The connection part 33 electrically short-circuits the port Sin and the port Sinout.

The further embodiment can achieve effects identical to those of the first embodiment.

Second Embodiment

Figure 5:
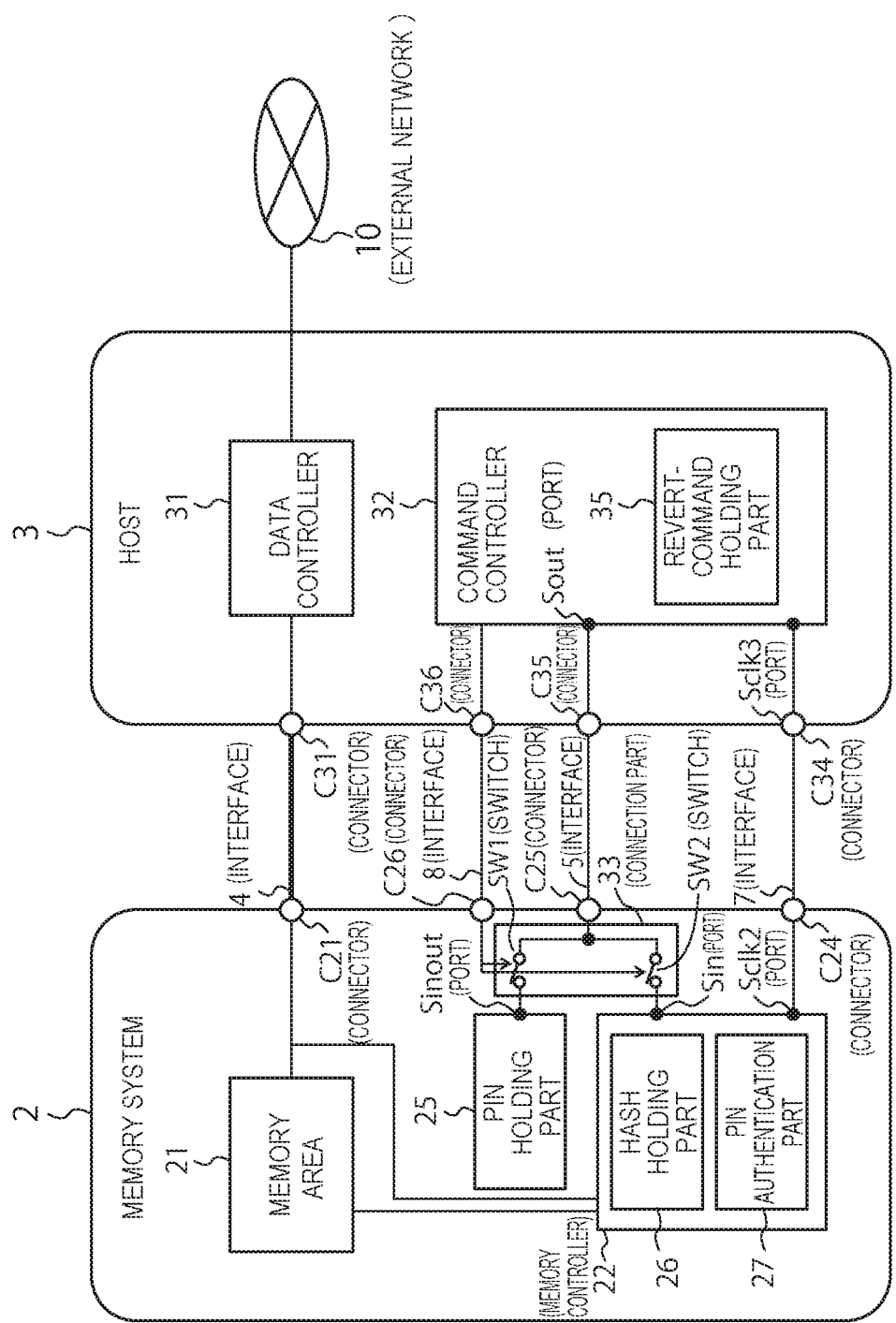
FIG. 5 is a block diagram illustrating an example of a configuration of a memory system according to a second embodiment.

FIG. 5 is a block diagram illustrating an example of the configuration of the information processing system 1 according to a second embodiment. The information processing system 1 according to the second embodiment includes the memory system 2 and the host 3. In the second embodiment, the connection part 33 is provided in the memory system 2.

The memory system 2 in the second embodiment includes the memory area 21, the memory controller 22, the PIN holding part 25, the connection part 33, the connectors C21 and C24, and connectors C25 and C26. Among these elements, the memory area 21, the memory controller 22, the PIN holding part 25, and the connectors C21 and C24 are identical in configuration as those of the first embodiment.

The connection part 33 is electrically connected to the port Sin, the port Sinout, and the connector C25. The connection part 33 electrically short-circuits the connector C25, the port Sinout, and the port Sin when reverting is executed. The connection part 33 outputs a revert command received from the host 3 to the port Sinout and the port Sin. The connection part 33 outputs the identification information C_PIN received from the port Sinout to the port Sin.

The connection part 33 includes the switch SW1 and the switch SW2. Each of the switches SW1 and SW2 is constituted by, for example, a transistor. The switches SW1 and SW2 are controlled by the command controller 32.

The connector C25 is electrically connected to both the port Sinout and the port Sin. The connector C25 is removably connected to the host 3 via a connector C35. The connector C25 is used to receive a revert command and other data, and transmit and receive the identification information C_PIN and other data. The connector C25 is connected to the connector C35 by the serial communication interface 5 to be capable of communicating with the connector C35.

The connector C26 is electrically connected to the switches SW1 and SW2. The connector C26 is removably connected to the host 3 via a connector C36. The connector C26 is used to receive control signals for the switches SW1 and SW2. The connector C26 is connected to the connector C36 by a serial communication interface 8 to be capable of communicating with the connector C36.

Here, as similar to the connectors C22 and C23, the connectors C25 and C26 are electrically disconnected from the connector C21. The interfaces 5 and 8 are a so-called "out-of-band interface".

The host 3 in the second embodiment includes the data controller 31, the command controller 32, and the connectors C31, C34, C35, and C36. Among these elements, the data controller 31, the command controller 32, and the connectors C31 and C34 are identical in configuration as those of the first embodiment.

The connector C35 is electrically connected to the port Sout. The connector C35 is used to transmit a revert command and other data.

The connector C36 is electrically connected to the command controller 32. The connector C36 is used to output control signals for the switches SW1 and SW2.

The second embodiment can achieve effects identical to those of the first embodiment.

Third Embodiment

Figure 6:
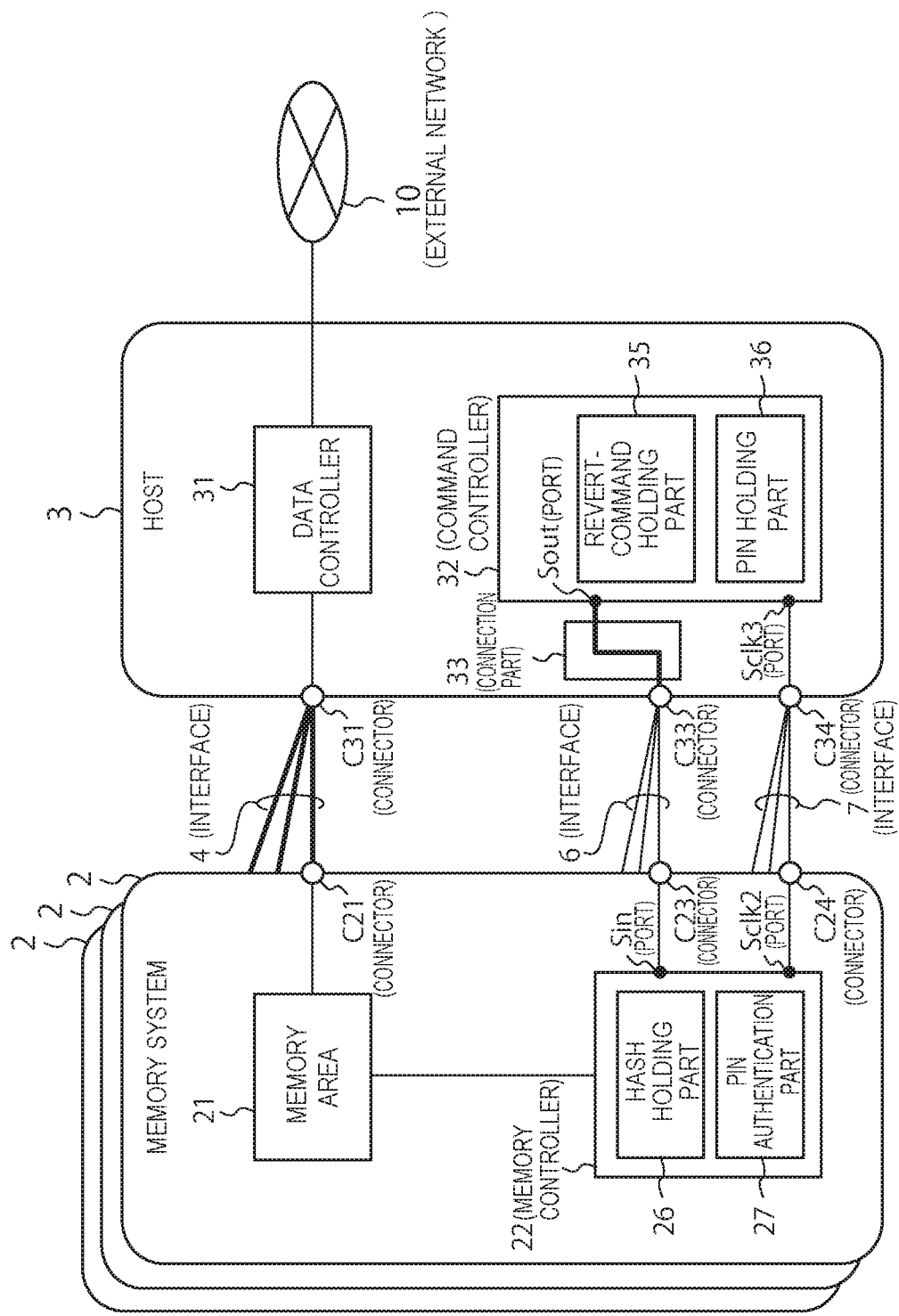
FIG. 6 is a block diagram illustrating an example of a configuration of a memory system according to a third embodiment.

FIG. 6 is a block diagram illustrating an example of the configuration of the information processing system 1 according to a third embodiment. The information processing system 1 according to the third embodiment includes a plurality of memory systems 2 and one host 3. In the third embodiment, the memory systems 2 are connected to the one host 3.

Each of the memory systems 2 in the third embodiment includes the memory area 21, the memory controller 22, and the connectors C21, C23, and C24. Among these elements, the memory area 21, the memory controller 22, and the connector C21, C23, and C24 are identical in configuration as those of the first embodiment.

The host 3 in the third embodiment includes the data controller 31, the command controller 32, the connection part 33, and the connectors C31, C33, and C34. Among these elements, the data controller 31 is identical in configuration as that of the first embodiment.

The connection part 33 in the third embodiment is a wiring configured to electrically connect the port Sout and the connector C33.

The command controller 32 includes the revert-command holding part 35 and a PIN holding part 36. The revert-command holding part 35 of these elements is identical in configuration as that of the first embodiment.

The PIN holding part 36 is, for example, a memory. The PIN holding part 36 holds the identification information C_PIN on each of the memory systems 2. The PIN holding part 36 outputs, from the port Sout, the identification information C_PIN on a memory system 2 of the memory systems 2, which is a revert target.

The connector C31 is electrically connected to the data controller 31. The connector C31 is removably connected to the connector C21 of each of the memory systems 2. The connector C31 is electrically disconnected from the connector C33 and the port Sout.

The connector C33 is electrically connected to the port Sout. The connector C33 is removably connected to the connector C23 of each of the memory systems 2. The connector C33 is used to output a revert command. The connector C33 is used to output the identification information C_PIN. The connector C33 is electrically disconnected from the connector C31.

The connector C34 is connected to the port Sclk3. The connector C34 is removably connected to the connector C24 of each of the memory systems 2. The connector C34 is electrically disconnected from the connectors C31 and C33 and the port Sout.

Figure 7:
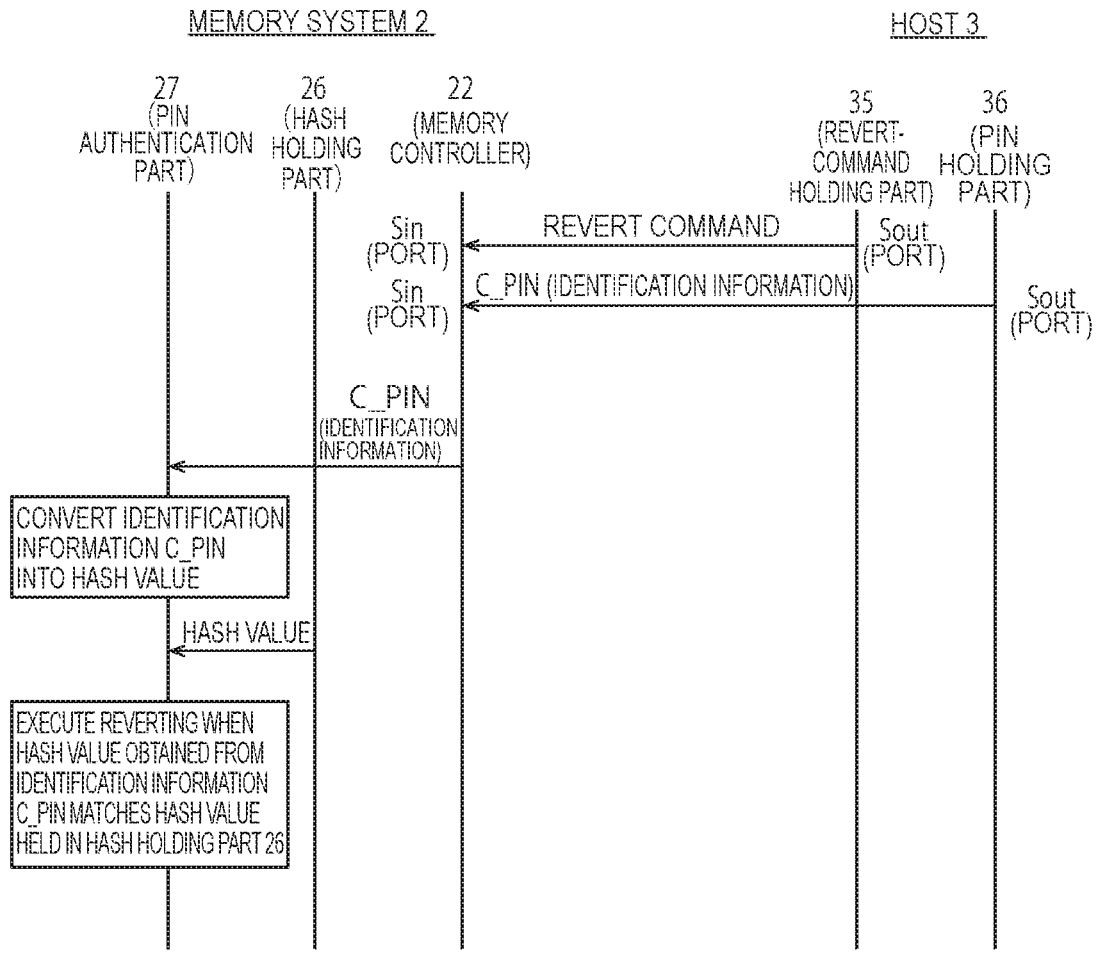
FIG. 7 is a sequence diagram illustrating an example of an operation of the memory system according to the third embodiment.

FIG. 7 is a sequence diagram illustrating an example of the operation of the information processing system 1 according to the third embodiment.

When a user requests reverting on the host 3, the revert-command holding part 35 of the host 3 outputs a revert command from the port Sout. After the revert command is output, the PIN holding part 36 outputs, from the port Sout, the identification information C_PIN on the memory system 2 which is a revert target.

The revert command and the identification information C_PIN are input to the port Sin of each of the memory systems 2.

Upon receiving the identification information C_PIN at the port Sin, the PIN authentication part 27 of each of the memory systems 2 converts the identification information C_PIN received from the port Sin into a hash value by using a hash function. Further, the PIN authentication part 27 of each of the memory systems 2 compares the hash value obtained by converting the identification information C_PIN with the hash value held in advance in the hash holding part 26.

When the hash value obtained from the identification information C_PIN matches the hash value held in the hash holding part 26, the PIN authentication part 27 executes reverting of the memory area 21.

When the hash value obtained from the identification information C_PIN does not match the hash value held in the hash holding part 26, the PIN authentication part 27 does not execute reverting of the memory area 21.

In the information processing system 1 according to the third embodiment, the host 3 can execute reverting only on a memory system 2 of the memory systems 2, which is indicated by the identification information C_PIN.

In the third embodiment, the memory systems 2 are connected to the one host 3. The host 3 can execute reverting only on a memory system 2 of the memory systems 2, which is indicated by the identification information C_PIN.

Fourth Embodiment

Figure 8:
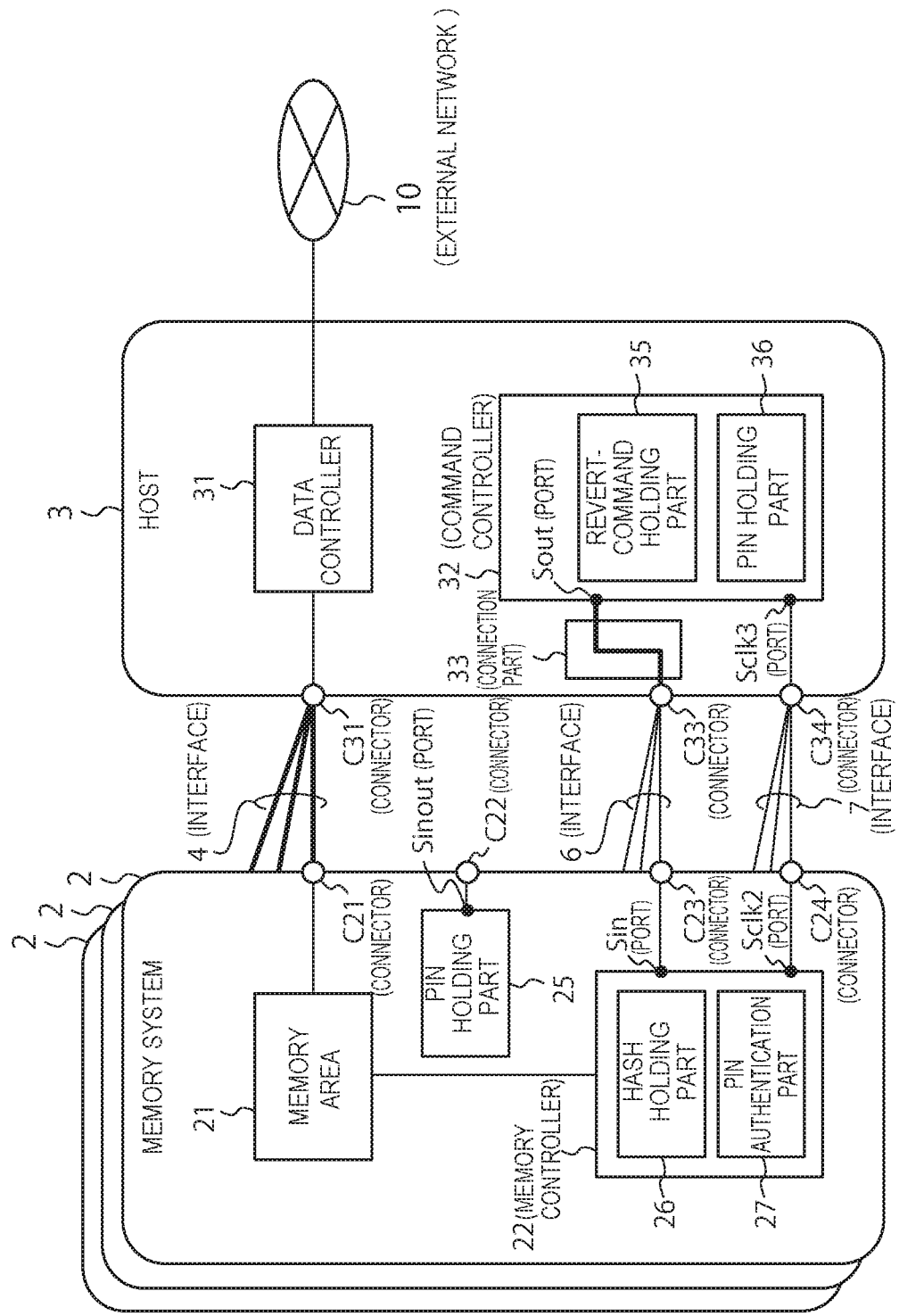
FIG. 8 is a block diagram illustrating an example of a configuration of a memory system according to a fourth embodiment.

FIG. 8 is a block diagram illustrating an example of the configuration of the information processing system 1 according to a fourth embodiment. The information processing system 1 according to the fourth embodiment includes a plurality of memory systems 2 and one host 3. In the fourth embodiment, the memory systems 2 are connected to the one host 3.

Each of the memory systems 2 in the fourth embodiment includes the memory area 21, the memory controller 22, the PIN holding part 25, and the connectors C21 to C24. Among these elements, the memory area 21, the memory controller 22, the PIN holding part 25, the connectors C21, C23, and C24 are identical in configuration as those of the first embodiment.

The connector C22 is electrically connected to the port Sinout of the PIN holding part 25. The connector C22 is electrically disconnected from the host 3.

The host 3 in the fourth embodiment includes the data controller 31, the command controller 32, the connection part 33, and the connectors C31, C33, and C34. Among these elements, the data controller 31, the command controller 32, the connection part 33, the connectors C31, C33, and C34 are identical in configuration as those of the third embodiment.

The fourth embodiment can achieve effects identical to those of the third embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

APPENDIX (9) An information processing system comprising a memory system and a host removably connected to the memory system, wherein
the memory system includes
a memory area configured to store data therein,
a controller configured to control the memory area,
a first connector configured to input the data from the host or output the data to the host, the first connector being removable from the host,
a first holding part electrically disconnected from the memory area and the first connector during an operation other than initialization of the memory area, the first holding part being configured to hold identification information used to authenticate an authority to initialize the memory area,
a first port connected to the first holding part, the first port being configured to output the identification information from the first holding part when receiving, from the host, an initialization command that instructs initialization of the memory area,
a second port configured to receive the initialization command from the host and receive the identification information from the first port, and
an authentication part configured to execute initialization of the memory area based on the initialization command and the identification information received at the second port, and
the host includes
a second connector configured to input the data from the memory system or output the data to the memory system, the second connector being removable from the first connector,
a second holding part configured to hold the initialization command, and
a third port configured to output the initialization command from the second holding part to the first port.

(10) The system of (9), wherein the first to third ports are electrically connected with each other in initializing the memory area.

(11) The system of (9), wherein the authority is a PSID authority, where a PSID complies with TCG standards.

(12) The system of (9), wherein
the memory system further includes
a second connector electrically connected to the first port and removable from the host, and
a third connector electrically connected to the second port and removable from the host, and
the host further includes
fifth and sixth connectors removable from the second and third connectors, respectively, and
a first wiring configured to electrically connect the fifth connector and the sixth connector to the third port.

(13) The system of (9), wherein
the memory system further includes
a second wiring configured to electrically connect the first port and the second port with each other, and
a second connector electrically connected to the second wiring and removable from the host, and
the host further includes an eighth connector electrically connected to the third port and removable from the second connector.

(14) The system of (9), wherein
a plurality of the memory systems are connected to the one host, and
the host further includes an identification-information holding part configured to hold identification information on each of the memory systems.

(15) An information processing system comprising a plurality of memory systems and a host removably connected to the memory systems, wherein
each of the memory systems includes
a memory area configured to store data therein,
a controller configured to control the memory area,
a first connector configured to input the data from the host or output the data to the host, the first connector being removable from the host,
a first port configured to receive an initialization command that instructs initialization of the memory area, and identification information used to authenticate an authority to initialize the memory area from the host, and
an authentication part configured to execute initialization of the memory area based on the initialization command and the identification information received at the first port, and
the host includes
a second connector configured to input the data from the memory system or output the data to the memory system, the second connector being removable from the first connector,
a first holding part electrically disconnected from the memory area and the first connector during an operation other than initialization of the memory area, the first holding part being configured to hold the identification information,
a second holding part configured to hold the initialization command, and
a third port configured to output the initialization command and the identification information.

(16) The system of (15), wherein the first to third ports are electrically connected with each other in initializing the memory area.

(17) The system of (15), wherein the authority is a PSID (Physical Presence Security Identifier) authority, where a PSID complies with TCG (Trusted Computing Group) standards.

(18) The system of (15), wherein
the memory system further includes
a second connector electrically connected to the first port and removable from the host, and
a third connector electrically connected to the second port and removable from the host, and
the host further includes
fifth and sixth connectors removable from the second and third connectors, respectively, and
a first wiring configured to electrically connect the fifth connector and the sixth connector to the third port.

(19) The system of (15), wherein
the memory system further includes
a second wiring configured to electrically connect the first port and the second port with each other, and
a second connector electrically connected to the second wiring and removable from the host, and
the host further includes an eighth connector electrically connected to the third port and removable from the second connector.

(20) The system of (15), wherein
a plurality of the memory systems are connected to the one host, and
the host further includes an identification-information holding part configured to hold identification information on each of the memory systems.

The invention claimed is:

1. A memory system comprising:
a memory area configured to store data therein;
a controller configured to control writing data to be input to and/or reading data to be output from the memory area;
a first connector configured to input the data to be input to the memory area from a host and/or output the data to be output from the memory area to the host, the first connector being removable from the host; and
a first holding part electrically disconnected from the memory area and the first connector and including a first port, the first holding part being configured to hold identification information used to authenticate an authority to initialize the memory area and the first port being configured to output the identification information to the host when receiving, from the host, an initialization command that instructs initialization of at least the part of the memory area;
the controller including:
a second port configured to receive the initialization command from the host and receive the identification information via the first port; and
an authentication part configured to execute initialization of at least the part of the memory area based on the initialization command and the identification information received at the second port.

2. The system of claim 1, wherein the first port and the second port are electrically connected with each other in initializing the memory area.

3. The system of claim 1, wherein the authority is for a PSID (Physical Presence Security Identifier) which complies with TCG (Trusted Computing Group) standards.

4. The system of claim 1, further comprising:
a second connector electrically connected to the first port; and a third connector electrically connected to the second port, the second connector and the third connector are removably connected to the host.

5. The system of claim 1,
the first port of the first holding part being configured to receive the initialization command from the host and output the identification information to the host and the second port,
the second port configured to receive the identification information from the first port; and
the authentication part configured to execute initialization of at least the part of the memory area, based on the initialization command from the host and the identification information received from the second port via the first port.

6. The system of claim 5,
in an operation of the initialization of at least the part of the memory area,
the first port of the first holding part receives the initialization command from the host and outputs the identification information to the host and the second port,
the second port receives the identification information from the first port; and
the authentication part executes initialization of at least the part of the memory area, based on the initialization command from the host and the identification information received from the second port via the first port.

7. The system of claim 5,
in normal operations other than the operation of initialization of at least the part of the memory area,
the first port of the first holding part does not receive any command from the host and does not output the identification information to the host and the second port.

8. The system of claim 1,
the operation of the initialization is a revert defined in the TCG standards.

9. The system of claim 7,
the normal operations other than the operation of initialization is operations excluding the revert and including reading data to be output from the memory area and writing data to be input to the memory area.

10. The system of claim 1, further comprising a connection part configured to electrically connect the first port and the second port with each other in initializing the memory area.

11. The system of claim 10, further comprising a fourth connector electrically connected to the connection part and the fourth connector removably connected to the host.

12. The system of claim 11, the fourth connector configured to be electrically connected to the host in initializing the memory area.

13. The system of claim 11, wherein the connection part includes a first switch connected between the first port and the fourth connector, and a second switch connected between the second port and the fourth connector.

14. The system of claim 11, the fourth connector does not connect to the first connector.

15. The system of claim 1, further comprising a second holding part configured to hold in advance a first value obtained by converting the identification information by using a first function, wherein
the authentication part executes initialization of the memory area when a second value obtained by converting the identification information received from the first holding part by using the first function matches the first value from the second holding part.

* * * * *